Sept. 23, 1924.

H. P. FEST

PRICE TAG

Filed Oct. 27, 1922   2 Sheets-Sheet 1

1,509,130

H. P. Fest,
INVENTOR

BY Victor J. Evans
ATTORNEY

WITNESSES

Sept. 23, 1924.

H. P. FEST

PRICE TAG

Filed Oct. 27, 1922    2 Sheets-Sheet 2

H. P. Fest,
INVENTOR

BY *Victor J. Evans*
ATTORNEY.

WITNESSES

Patented Sept. 23, 1924.

1,509,130

UNITED STATES PATENT OFFICE.

HERMAN P. FEST, OF SAN DIEGO, CALIFORNIA.

PRICE TAG.

Application filed October 27, 1922. Serial No. 597,356.

*To all whom it may concern:*

Be it known that I, HERMAN P. FEST, a citizen of the United States, residing at San Diego, in the county of San Diego and State of California, have invented new and useful Improvements in Price Tags, of which the following is a specification.

This invention has for its object the provision of an embossed metallic price tag which is designed to support itself on a horizontal support, or suspended from a garment from which it can be conveniently associated or removed as the occasion may require, the invention residing in the construction, combination, and arrangement of parts as claimed.

In the drawings forming part of this application, like numerals of reference indicate similar parts in the several views, and wherein:—

Figure 1:
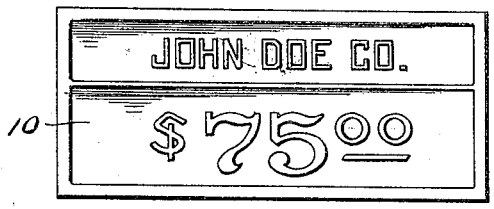
Figure 1 is a plan view of a tag constructed in accordance with one embodiment of the invention.

Referring to the drawings in detail, and particularly to Figure 1, 10 indicates an embossed metallic tag which may contain the firm's name or monogram as well as the price of the particular article, which it is adapted to be associated with. The tag is to be made in different sizes and shapes without departing from the spirit of the invention.

Figure 2:
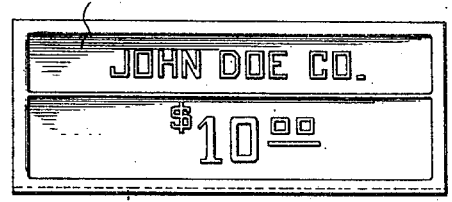
Figure 2 is a view in elevation of a modified form of the invention.
Figure 3:
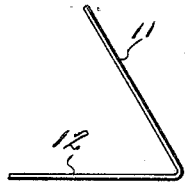
Figure 3 is a sectional view taken on line 3—3 of Figure 2.

In Figures 2 and 3, I have illustrated a modified form of the invention wherein the body portion of the tag is indicated at 11 and properly embossed, while projecting rearwardly from the lower edge of the tag is a horizontally disposed base 12 which is utilized to support the tag in a manner shown. The body of the tag 11 is preferably arranged at an inclination to the base 12.

Figure 4:
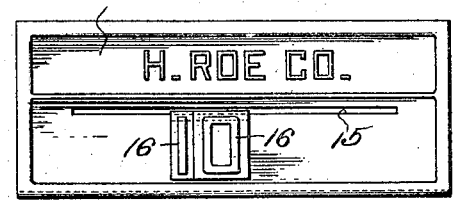
Figure 4 is a view somewhat similar to Figure 2, showing another modification.

In Figure 4, I have shown another modified form of the invention which possesses the same configuration as the structure illustrated in Figure 2, the body portion of the tag being indicated at 13 and associated with the base 14. In this form of the invention, the body 13 is provided with the name or monogram of the company or firm using the tag, and is also provided with a longitudinal slot 15, so that separate letters or monograms can be used, one of which is indicated at 16.

Figure 5:
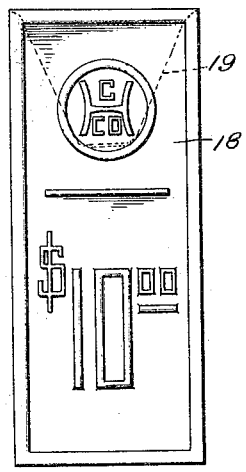
Figure 5 is a front elevation of a further modified form of the invention.
Figure 6:
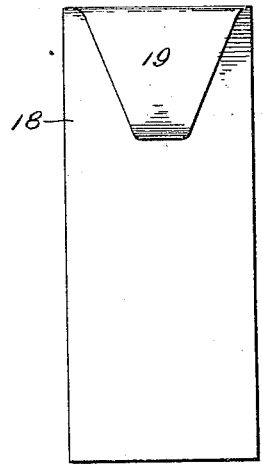
Figure 6 is a rear elevation thereof.
Figure 7:
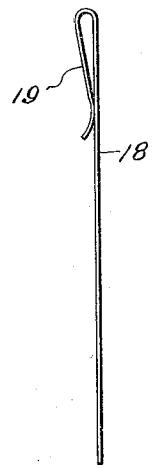
Figure 7 is a sectional view taken on line 7—7 of Figure 5.

In Figures 5, 6 and 7 I have illustrated a further modified form of the invention wherein the body of the tag is indicated at 18 and of elongated configuration and adapted to be embossed with the proper indicia, depending of course upon the particular use to which the tag is to be put. The upper end of the tag is bent rearwardly upon itself to provide a clamping member 19 which is utilized to clamp the tag to the label of a garment, or to suspend the tag from the pocket of the garment in a manner to permit the tag to be easily attached to or removed from the garment as the occasion may require.

Figure 8:
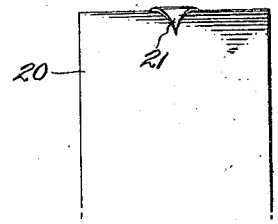
Figure 8 is a fragmentary detailed view of a still further modified form of the invention.

In Figure 8, the body of the tag is indicated at 20, and the upper end of the tag is provided with a pointed extension 21 which is arranged at the rear of the tag and which extension is adapted to be embedded in the cloth of a garment to hold the tag associated therewith. Any form of the invention can be manufactured and sold at a very nominal cost.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A price tag formed from a single piece of metal and including a horizontal base portion, and an obliquely disposed wall projecting upwardly and rearwardly from the forward longitudinal edge of the base portion, a rib extending across said wall to divide the latter into an upper space adapted to contain a name, and a lower space adapted to contain indicia relating to the price of the merchandise, said wall beneath said rib being provided with a slot arranged parallel with said rib, and separate figures adapted to be supported in said slot.

In testimony whereof I affix my signature.

HERMAN P. FEST.